US009288694B2

(12) United States Patent
Chiba et al.

(10) Patent No.: US 9,288,694 B2
(45) Date of Patent: Mar. 15, 2016

(54) PARTIAL FAILURE HANDLING OF BEARER MAPPING IN DUAL CONNECTIVITY

(71) Applicant: NOKIA SOLUTIONS AND NETWORKS OY, Espoo (FI)

(72) Inventors: Tsunehiko Chiba, Saitama (JP); Srinivasan Selvaganapathy, Bangalore (IN); Subramanian Iyer, Vernon Hills, IL (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 125 days.

(21) Appl. No.: 14/175,216

(22) Filed: Feb. 7, 2014

(65) Prior Publication Data

US 2015/0230107 A1    Aug. 13, 2015

(51) Int. Cl.
     *H04L 12/26*      (2006.01)
     *H04W 24/04*      (2009.01)
     *H04W 76/02*      (2009.01)

(52) U.S. Cl.
     CPC ............ *H04W 24/04* (2013.01); *H04W 76/025* (2013.01)

(58) Field of Classification Search
None
See application file for complete search history.

(56) References Cited

U.S. PATENT DOCUMENTS

| 2015/0117183 | A1* | 4/2015 | Heo et al. | 370/228 |
| 2015/0133122 | A1* | 5/2015 | Chen | 455/436 |

OTHER PUBLICATIONS

3GPP TR 36.842 V1.0.0 (Nov. 2013) "3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects" (Release 12), 68 pages.
3 GPP TSG-RAN WG3 Meeting #82, R3-132101 "Handover procedure in case of bearer only served by SeNB (1A)" San Francisco, USA, Nov. 11-15, 2013, 13 pages.
Nsn et al: "SeNB change and inter-MeNB handover procedure"; 3GPP Draft; R2-140371; 3rd Generation Partnership Project (3GPP); Mobile Competence Centre; 650, Route des Lucioles; F-06921 Sophia-Antipolis Cedex; France; vol. RAN WG2; no. Prague, Czech Republic; Feb. 10, 2014-Feb. 14, 2014; Jan. 31, 2014; XP050754122; Retrieved from the Internet: URL:http://www.3gpp.org/ftp/tsg_ran/WG2_RL2/TSGR2_85/Docs/ [retrieved on Jan. 31, 2014] the whole document.
Nsn et al: "Xn functions"; 3GPP Draft; R3-132100; 3rd Generation Partnership Project (3GPP); Mobile Competence Centre; 650, Route des Lucioles; F-06921 Sophia-Antipolis Cedex; France; vol. RAN WG3; no. San Francisco, USA; Nov. 11, 2013-Nov. 15, 2013; Nov. 13, 2013; XP050738360; Retrieved from the Internet: URL:http://www.3gpp.org/ftp/Meetings_3GPP_SYNC/RAN/RAN3/Docs/ [retrieved on Nov. 13, 2013]; paragraph [02.6].

(Continued)

*Primary Examiner* — Afshawn Towfighi
(74) *Attorney, Agent, or Firm* — Squire Patton Boggs (US) LLP

(57) ABSTRACT

Systems, methods, apparatuses, and computer program products for partial failure handling of bearer mapping in dual connectivity are provided. One method includes, during a secondary evolved node B (SeNB) addition procedure, providing a target SeNB with an indication of SeNB change together with information on bearers that were served by a source SeNB. The method may further include receiving, by a master evolved node B (MeNB), bearer mapping for failed bearers from the target SeNB, and providing the source SeNB with the bearer mapping for the failed bearers.

26 Claims, 3 Drawing Sheets

(56) References Cited

OTHER PUBLICATIONS

Nsn et al: "Handover procedure in case of bearer served by MeNB and SeNB (3C)"; 3GPP Draft; R3-132102; 3rd Generation Partnership Project (3GPP); Mobile Competence Centre; 650, Route des Lucioles; F-06921 Sophia-Antipolis Cedex; France; vol. RAN WG3; no. San Francisco, USA; Nov. 11, 2013-Nov. 15, 2013-20131115; Nov. 13, 2013; XP050738362; Retrieved from the Internet: URL:http://www.3gpp.org/ftp/Meetings_3GPP_SYNC/RAN/RAN3/Docs/ [retrieved on Nov. 13, 2013] the whole document.
International Search Report application No. PCT/EP2015/052355 mailed Jun. 3, 2015.

* cited by examiner

PARTIAL FAILURE HANDLING OF BEARER MAPPING IN DUAL CONNECTIVITY

BACKGROUND

1. Field

Embodiments of the invention generally relate to mobile communications networks, such as, but not limited to, the Universal Mobile Telecommunications System (UMTS) Terrestrial Radio Access Network (UTRAN), Long Term Evolution (LTE) Evolved UTRAN (E-UTRAN), and/or LTE-A.

2. Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and most of the RNC functionalities are contained in the evolved Node B (eNodeB or eNB).

Long Term Evolution (LTE) or E-UTRAN refers to improvements of the UMTS through improved efficiency and services, lower costs, and use of new spectrum opportunities. In particular, LTE is a 3GPP standard that provides for uplink peak rates of at least 50 megabits per second (Mbps) and downlink peak rates of at least 100 Mbps. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high-capacity voice support. Advantages of LTE include, for example, high throughput, low latency, FDD and TDD support in the same platform, an improved end-user experience, and a simple architecture resulting in low operating costs.

Further releases of 3GPP LTE (e.g., LTE Rel-11, LTE Rel-12) are targeted towards future international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while keeping the backward compatibility.

SUMMARY

One embodiment is directed to a method that may include, during a secondary evolved node B (SeNB) addition procedure, providing a target SeNB with an indication of SeNB change together with information on bearers that were served by a source SeNB. The method may further include receiving, by a master evolved node B (MeNB), bearer mapping for failed bearers from the target SeNB, and providing the source SeNB with the bearer mapping for the failed bearers.

Another embodiment is directed to an apparatus that may include at least one processor and at least one memory including computer program code. The at least one memory and the computer program code may be configured, with the at least one processor, to cause the apparatus at least to, during a secondary evolved node B (SeNB) addition procedure, provide a target SeNB with an indication of SeNB change together with information on bearers that were served by a source SeNB. The at least one memory and the computer program code may be further configured, with the at least one processor, to cause the apparatus at least to receive bearer mapping for failed bearers from the target SeNB, and to provide the source SeNB with the bearer mapping for the failed bearers.

Another embodiment is directed to a computer program, embodied on a computer readable medium. The computer program may be configured to control a processor to perform a process including, during a secondary evolved node B (SeNB) addition procedure, providing a target SeNB with an indication of SeNB change together with information on bearers that were served by a source SeNB. The process may further include receiving bearer mapping for failed bearers from the target SeNB, and providing the source SeNB with the bearer mapping for the failed bearers.

Another embodiment is directed to a method that may include receiving, during a secondary evolved node B (SeNB) addition procedure, an indication of SeNB change together with information on bearers that were served by a source SeNB. The method may further include sending bearer mapping for failed bearers to a master evolved node B (MeNB) and configuration information of successfully accepted bearers by a target SeNB.

Another embodiment is directed to an apparatus that may include at least one processor and at least one memory including computer program code. The at least one memory and the computer program code may be configured, with the at least one processor, to cause the apparatus at least to receive, during a secondary evolved node B (SeNB) addition procedure, an indication of SeNB change together with information on bearers that were served by a source SeNB, and to send bearer mapping for failed bearers to a master evolved node B (MeNB) and configuration information of successfully accepted bearers by the apparatus.

Another embodiment is directed to a computer program, embodied on a computer readable medium. The computer program may be configured to control a processor to perform a process including receiving, during a secondary evolved node B (SeNB) addition procedure, an indication of SeNB change together with information on bearers that were served by a source SeNB. The process may further include sending bearer mapping for failed bearers to a master evolved node B (MeNB) and configuration information of successfully accepted bearers by a target SeNB.

BRIEF DESCRIPTION OF THE DRAWINGS

For proper understanding of the invention, reference should be made to the accompanying drawings, wherein.

DETAILED DESCRIPTION

Figure 1:
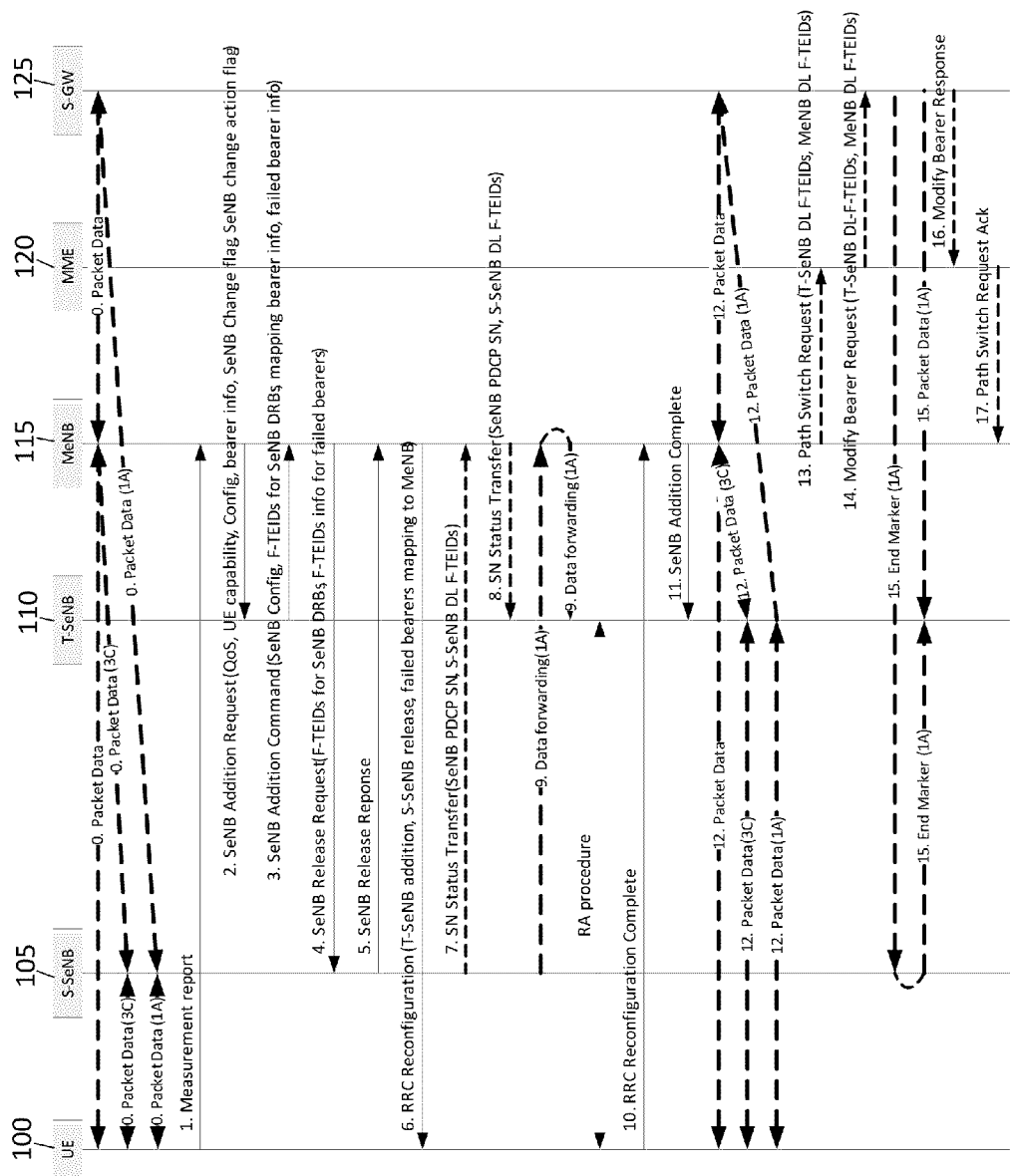
FIG. 1 illustrates an example of a signaling diagram, according to one embodiment.

It will be readily understood that the components of the invention, as generally described and illustrated in the figures herein, may be arranged and designed in a wide variety of different configurations. Thus, the following detailed description of the embodiments of systems, methods, apparatuses, and computer program products for partial failure handling of bearer mapping in dual connectivity, as represented in the attached figures, is not intended to limit the scope of the invention, but is merely representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments. Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

As background, 3GPP RAN2 and RAN3 had worked on Release 12 Small Cell Enhancement higher layer study item (SI) and the SI was captured in 3GPP TR36.842 v1.0.0 and completed at RAN#62 plenary. 3GPP RAN2 and RAN3 have also started working on Dual Connectivity work item (WI) according to the outcome of TR36.842

In dual connectivity operation, the master eNB (MeNB), which is responsible for S1-mobility management entity (MME) connection, controls the secondary eNB (SeNB). The SeNB may be added or released by the MeNB through SeNB addition and SeNB release procedures specified in Annex G of 3GPP TR36.842. However, the specification defines only the successful case and the partial failure case during SeNB change has not been specified.

Therefore, certain embodiments of the present invention provide a method and system for optimal bearer handling in the partial failure case during SeNB change.

In dual connectivity operation, all the bearers which have been served by the source SeNB cannot be assumed to be handed over to the target SeNB during SeNB change. In reality, the target SeNB can accept some bearers and unaccepted bearers should be moved back to MeNB depending on the configuration or resources.

In the case of normal SeNB addition (e.g., SeNB newly added for the UE), there are no issues for failed bearers because the radio resource control (RRC) container sent from the SeNB contains a mapping of accepted bearers only. Therefore, failed bearers continue to be served in the MeNB without any further issues.

In the case of SeNB change, the target SeNB modifies the mapping of accepted bearers from the source SeNB to the target SeNB in a SeNB addition procedure. The failed bearers, if left untouched as per current behavior, will remain mapped to the source SeNB.

The message sent to the UE also maps the accepted bearer(s) to the target SeNB. Before sending this message all source SeNB resources are released. Therefore, after reception of the RRC Reconfig message, the UE will have the failed bearer mapping to source SeNB. However, actually the resources are released in source SeNB prior to this message itself. Then, the failed bearer packets will be dropped and it will also not be explicitly released in the MME.

As a result, the current SeNB addition procedure results in invalid configuration in case of partial failure during SeNB change. One possibility to solve this issue is for the MeNB to modify the RRC information from the target SeNB considering failed bearers; however, this leads to more processing at the MeNB.

In view of the issues noted above, embodiments of the invention provide for optimal bearer handling in the partial failure case during SeNB change. According to one embodiment, in the case of SeNB change, the MeNB may provide the target SeNB, in the SeNB addition procedure, the indication of SeNB change together with the information on the bearers which have been served by the source SeNB. In an embodiment, the target SeNB may include the mapping for failed bearers (bearers that the target SeNB is not able to admit) in addition to the configuration information of successfully accepted bearers in the RRC container sent to the MeNB. In an embodiment, the MeNB may provide the source SeNB, in the SeNB release procedure, information related to mapping back the failed bearers to the MeNB. As such, the MeNB may provide the source SeNB with information for forwarding the downlink packets of failed bearers back to the MeNB.

In one embodiment, before the MeNB provides an indication of SeNB change, the MeNB may check, for example based on configuration of bearers and resource loading condition(s), whether the failed bearers can be accepted at the MeNB. If the MeNB cannot accept the failed bearers per the above checks, the MeNB may indicate to the SeNB to release the failed bearers. In this case, the SeNB may include an explicit release of failed bearers in the RRC container. According to an embodiment, the MeNB can indicate whether the failed bearers should be released (i.e., whether it has sufficient resources or not) via a flag, such as a SeNB-change-action flag. This flag can, for example, be set to "switch" or "release". When the flag is set to "switch," it would mean that the failed bearers are to be switched back to the MeNB, and, when the flag is set to "release," it would mean that the failed bearers should be released in RRC container.

FIG. 1 illustrates an example signalling diagram for SeNB change with optimal partial failure handling, according to an embodiment. As illustrated in the example of FIG. 1, at 0, packet data may be transferred between the serving gateway (S-GW) 125 and the UE 100 by passing through MeNB 115 or source SeNB (S-SeNB) 105 depending on the User-Plane option (i.e., option 1A or 3C) in dual connectivity mode.

Continuing with FIG. 1, at 1, a measurement report may be triggered and sent by UE 100 to MeNB 115. Then, at 2, MeNB 115 may send to target SeNB (T-SeNB) 110 an addition request message including QoS, UE capability, S-SeNB uplink (UL) Fully Qualified Tunnel Endpoint Identifiers (F-TEIDs) with S-GW 125 (only for 1A) and configuration information. In an embodiment, MeNB may include the flag for SeNB change, the SeNB change action flag, as well as the information of bearers served by S-SeNB 105 in the addition request message sent to T-SeNB 110.

At 3, T-SeNB 110 may respond with a SeNB addition command message including T-SeNB configuration information, T-SeNB downlink (DL) F-TEIDs with S-GW, and F-TEIDs used for T-SeNB 110 receiving forwarded packets from MeNB. According to an embodiment, when the SeNB-change-action flag is set to "switch", T-SeNB 110 may include the information of both successful mapping and failed bearers in RRC information. For the failed bearers, MeNB 115 allocates radio resources and also the F-TEIDs for the failed bearers to be used in the next step.

At 4, MeNB 115 may send, to S-SeNB 105, a SeNB release request message that may include F-TEIDs (only for 1A) used for MeNB 115 receiving forwarded packets from S-SeNB 105. According to an embodiment, MeNB 115 may include its F-TEIDs for the failed bearers which are mapped back to MeNB 115. At 5, S-SeNB 105 may respond to MeNB 115 with a SeNB release response message and release the radio resource for the UE 100. If MeNB 115 cannot allocate resources for one or more bearers mapped to MeNB 115 on reception of the SeNB addition command, MeNB 115 may regenerate the complete message releasing the bearers that cannot be mapped.

At 6, MeNB 115 may generate a RRC message to perform the SeNB change (i.e., RRCConnectionReconfiguration message), or transparently send the RRC-reconfiguration message content received from T-SeNB, to indicate that T-SeNB 110 is added and S-SeNB 105 is released. This RRC message may be sent to UE 100 so that the UE 100 can switch the data transmission from S-SeNB 105 to T-SeNB 115. According to an embodiment, this RRC message sent to UE 100 may contain the failed bearers mapping back to MeNB.

At 7, S-SeNB 105 may send a sequence number (SN) status transfer message, which may include the uplink Packet Data Convergence Protocol (PDCP) SN and hyper frame number (HFN) receiver status and the downlink PDCP SN and HFN transmitter status of S-SeNB 105, to MeNB 115. This procedure may only occur only for option 1A.

At 8, MeNB 115 may send, to T-SeNB 110, a SN status transfer message including the uplink PDCP SN and HFN receiver status and the downlink PDCP SN and HFN transmitter status of S-SeNB 105. This procedure may occur only for option 1A. At 9, S-SeNB 105 may perform data forwarding to MeNB 115. T-SeNB 110 may buffer forwarded packets from MeNB 115 until it receives the SeNB addition complete message. For failed bearer(s), MeNB may buffer the packet until RRC-reconfiguration complete is received from UE 100.

At 10, after receiving the RRCConnectionReconfiguration message indicating that T-SeNB 110 is added and S-SeNB 105 is released, UE 100 may perform random access procedure towards T-SeNB 110 and sends a RRCConnectionReconfigurationComplete message to MeNB 115. Then, at 11, MeNB 115 may send a SeNB addition complete message to T-SeNB 110 so that T-SeNB 110 can start sending buffered packets to the UE 100.

At 12, packet data may be transferred between S-GW 125 and the UE 100 by passing through MeNB 115, or T-SeNB 110 depending on the User-Plane option (e.g., 1A or 3C) in dual connectivity mode. DL packets from S-GW 125 may go through T-SeNB 110 to the UE 100 after S-GW 125 receives a modify bearer request message from MME 120 in step 14 in case of option 1A.

For option 1A, at 13, MeNB 115 may send a path switch request message including both T-SeNB DL F-TEIDs with S-GW and MeNB DL F-TEIDs (same as above) to MME 120 to inform that the UE 100 has changed SeNB. According to an embodiment, in this step, MeNB 115 may provide its own DL F-TEIDs endpoint for the bearers which were failed and mapped back to MeNB 115. At 14, MME 120 may send a modify bearer request message including both T-SeNB DL F-TEIDs with S-GW and MeNB DL F-TEIDs (same as above) to S-GW 125. At 15, S-GW 125 may switch the downlink data path to the target side. S-GW 125 may send one or more "end marker" packets on the old path to S-SeNB 105 and then can release any U-plane/transport network layer (TNL) resources towards S-SeNB 105. DL packets from S-GW 125 may be sent through T-SeNB 110 to the UE 100. At 16, S-GW 125 may send a modify bearer response message to MME 120. At 17, MME 120 may confirm the path switch request message with the path switch request acknowledge message.

Figure 2A:
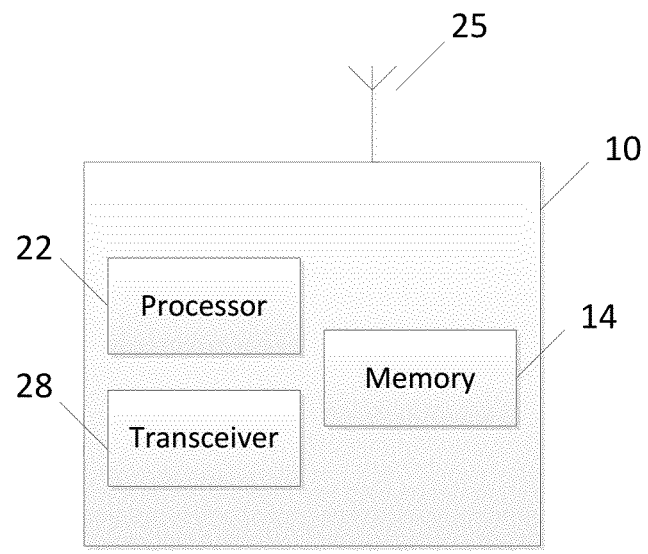
FIG. 2a illustrates an apparatus according to one embodiment.

FIG. 2a illustrates an example of an apparatus 10 according to an embodiment. In an embodiment, apparatus 10 may be a node, host, server, and/or base station in a communications network or serving such a network, such as an evolved node B (eNB) in LTE or LTE-A. It should be noted that one of ordinary skill in the art would understand that apparatus 10 may include components or features not shown in FIG. 2a.

As illustrated in FIG. 2a, apparatus 10 may include a processor 22 for processing information and executing instructions or operations. Processor 22 may be any type of general or specific purpose processor. While a single processor 22 is shown in FIG. 2a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 may further comprise or be coupled to a memory 14 (internal or external), which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 may be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also comprise or be coupled to one or more antennas 25 for transmitting and receiving signals and/or data to and from apparatus 10. Apparatus 10 may further comprise or be coupled to a transceiver 28 configured to transmit and receive information. The transceiver may be an external device, such as a remote radio head. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 stores software modules that provide functionality when executed by processor 22. The modules may include, for example, an operating system that provides operating system functionality for apparatus 10.

The memory may also store one or more functional modules, such as an application or program, to provide additional functionality for apparatus 10. The components of apparatus 10 may be implemented in hardware, or as any suitable combination of hardware and software.

As mentioned above, according to one embodiment, apparatus 10 may be a server, node or host or base station in a communications network or serving such a network. In this example embodiment, apparatus 10 may be a MeNB as discussed above. In one embodiment, apparatus 10 may be controlled by memory 14 and processor 22, during a secondary evolved node B (SeNB) addition procedure, to provide a target SeNB with an indication of SeNB change together with information on bearers that were served by a source SeNB. In an embodiment, the provision of the indication of SeNB change and the information on the bearers that were served by the source SeNB may be done via an addition request message.

In one embodiment, apparatus 10 may be further controlled by memory 14 and processor 22 to receive bearer mapping for failed bearers from the target SeNB and possibly also receive information on successfully accepted bearers by the target SeNB. In an embodiment, the bearer mapping for the failed bearers and the configuration information of the successfully accepted bearers may be received in an addition command message. According to one embodiment, the failed bearers may include those bearers that the target SeNB is not able to admit.

According to an embodiment, apparatus 10 may be further controlled by memory 14 and processor 22 to provide the source SeNB with the bearer mapping for the failed bearers. In an embodiment, apparatus 10 may also be controlled by memory 14 and processor 22 to, for the failed bearers, allocate radio resources and F-TEIDs for the failed bearers, and to provide the source SeNB with Fully Qualified Tunnel Endpoint Identifiers (F-TEIDs) for the failed bearers which are mapped back to the apparatus.

In one embodiment, apparatus 10 may be further controlled by memory 14 and processor 22 to generate a message to indicate SeNB change from the source SeNB to the target SeNB, and to send the message to a user equipment. In an embodiment, this message may include the failed bearers mapping back to the apparatus.

Figure 2B:
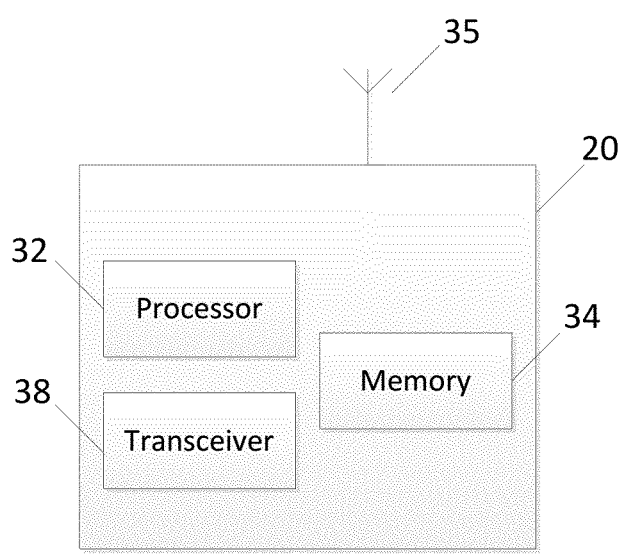
FIG. 2b illustrates an apparatus according to another embodiment.

FIG. 2b illustrates an example of an apparatus 20 according to an embodiment. In an embodiment, apparatus 20 may be a node, host, server, and/or base station in a communications network or serving such a network, such as an eNB. It should be noted that one of ordinary skill in the art would understand that apparatus 20 may include components or features not shown in FIG. 2b.

As illustrated in FIG. 2b, apparatus 20 may include a processor 32 for processing information and executing instructions or operations. Processor 32 may be any type of general or specific purpose processor. While a single processor 32 is shown in FIG. 2b, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 may further comprise or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 may be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

Apparatus 20 may also comprise or be coupled to one or more antennas 35 for transmitting and receiving signals and/or data to and from apparatus 20. Apparatus 20 may further comprise or be coupled to a transceiver 38 configured to transmit and receive information. The transceiver may be an external device, such as a remote radio head. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a server, node, host, and/or base station in a communications network or serving such a network, such as a eNB. In this example embodiment, apparatus 20 may be a secondary eNB, such as a target SeNB. In one embodiment, apparatus 20 may be controlled by memory 34 and processor 32 to receive, during a secondary evolved node B (SeNB) addition procedure, an indication of SeNB change together with information on bearers that were served by a source SeNB. Apparatus 20 may then be controlled by memory 34 and processor 32 to send bearer mapping for failed bearers to a master evolved node B (MeNB) and configuration information of successfully accepted bearers by the apparatus.

Figure 3:
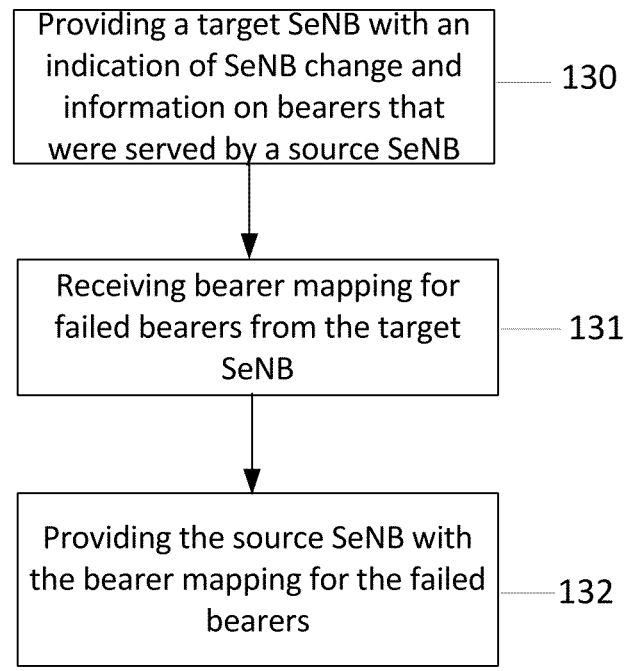
FIG. 3 illustrates a flow diagram of a method according to one embodiment.

FIG. 3 illustrates an example flow diagram of a method for partial failure handling of bearer mapping in dual connectivity, according to one embodiment. In some embodiments, the method may be performed by a MeNB. The method may include, at 130, during a secondary evolved node B (SeNB) addition procedure, providing a target SeNB with an indication of SeNB change together with information on bearers that were served by a source SeNB. The method may then include, at 131, receiving bearer mapping for failed bearers from the target SeNB. At 132, the method may further include providing the source SeNB with the bearer mapping for the failed bearers.

Figure 4:
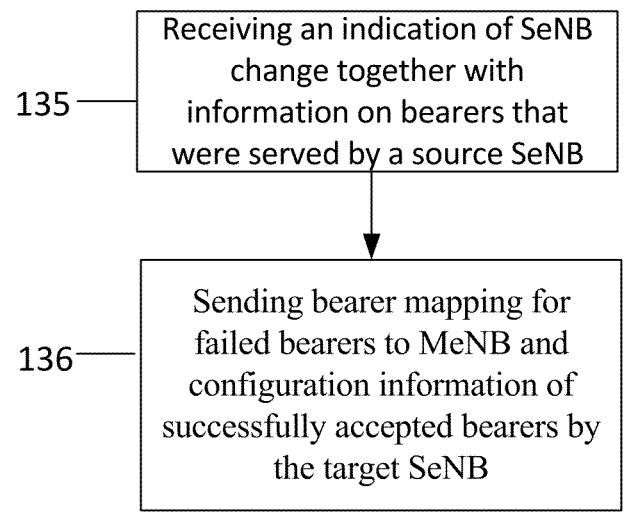
FIG. 4 illustrates a flow diagram of a method according to another embodiment.

FIG. 4 illustrates an example flow diagram of a method for partial failure handling of bearer mapping in dual connectivity, according to another embodiment. In some embodiments, the method may be performed by a SeNB, such as a target SeNB. The method may include, at 135, receiving, during a secondary evolved node B (SeNB) addition procedure, an indication of SeNB change together with information on bearers that were served by a source SeNB. The method may then include, at 136, sending bearer mapping for failed bearers to a master evolved node B (MeNB) and configuration information of successfully accepted bearers by the target SeNB.

In some embodiments, the functionality of any of the methods described herein, such as that illustrated in FIGS. 3 and 4 discussed above, may be implemented by software and/or computer program code stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

Embodiments of the invention may provide several advantages. Some advantages include that the MeNB and SeNB can handle failed bearers without any configuration mismatching and without increasing processing power at the MeNB.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
   during a secondary evolved node B (SeNB) addition procedure, providing a target SeNB with an indication of SeNB change together with information on bearers that were served by a source SeNB;
   receiving, by a master evolved node B (MeNB), bearer mapping for failed bearers from the target SeNB; and
   providing the source SeNB with the bearer mapping for the failed bearers.

2. The method according to claim 1, further comprising, for the failed bearers, allocating radio resources and Fully Qualified Tunnel Endpoint Identifiers (F-TEIDs) for the failed bearers.

3. The method according to claim 1, wherein the providing of the source SeNB with the bearer mapping for the failed bearers further comprises providing Fully Qualified Tunnel Endpoint Identifiers (F-TEIDs) for the failed bearers which are mapped back to the MeNB.

4. The method according to claim 1, wherein the receiving further comprises receiving configuration information of successfully accepted bearers by the target SeNB.

5. The method according to claim 4, wherein the receiving further comprises receiving the bearer mapping for the failed bearers and the configuration information of the successfully accepted bearers in an addition command message.

6. The method according to claim 1, wherein the providing the indication of SeNB change and the information on bearers that were served by the source SeNB comprises providing the indication of SeNB change and the information on bearers that were served by the source SeNB in an addition request message.

7. The method according to claim 1, wherein the failed bearers comprise bearers that the target SeNB is not able to admit.

8. The method according to claim 1, further comprising:
   generating a message to indicate SeNB change from the source SeNB to the target SeNB; and
   sending the message to a user equipment,
   wherein the message comprises the failed bearers mapping back to the MeNB.

9. The method according to claim 1, further comprising, when resources for the failed bearers mapped back to the MeNB cannot be allocated, regenerating a complete message releasing the failed bearers that cannot be mapped.

10. An apparatus, comprising:
    at least one processor; and
    at least one memory including computer program code,
    wherein the at least one memory and the computer program code are configured, with the at least one processor, to cause the apparatus at least to
    during a secondary evolved node B (SeNB) addition procedure, provide a target SeNB with an indication of SeNB change together with information on bearers that were served by a source SeNB;
    receive bearer mapping for failed bearers from the target SeNB; and
    provide the source SeNB with the bearer mapping for the failed bearers.

11. The apparatus according to claim 10, wherein the at least one memory and the computer program code are further configured, with the at least one processor, to cause the apparatus at least to, for the failed bearers, allocate radio resources and Fully Qualified Tunnel Endpoint Identifiers (F-TEIDs) for the failed bearers.

12. The apparatus according to claim 10, wherein the at least one memory and the computer program code are further configured, with the at least one processor, to cause the apparatus at least to provide the source SeNB with Fully Qualified Tunnel Endpoint Identifiers (F-TEIDs) for the failed bearers which are mapped back to the apparatus.

13. The apparatus according to claim 10, wherein the at least one memory and the computer program code are further configured, with the at least one processor, to cause the apparatus at least to receive configuration information of successfully accepted bearers by the target SeNB.

14. The apparatus according to claim 13, wherein the at least one memory and the computer program code are further configured, with the at least one processor, to cause the apparatus at least to receive the bearer mapping for the failed bearers and the configuration information of the successfully accepted bearers in an addition command message.

15. The apparatus according to claim 10, wherein the at least one memory and the computer program code are further configured, with the at least one processor, to cause the apparatus at least to provide the indication of SeNB change and the information on bearers that were served by the source SeNB in an addition request message.

16. The apparatus according to claim 10, wherein the failed bearers comprise bearers that the target SeNB is not able to admit.

17. The apparatus according to claim 10, wherein the at least one memory and the computer program code are further configured, with the at least one processor, to cause the apparatus at least to:
    generate a message to indicate SeNB change from the source SeNB to the target SeNB; and send the message to a user equipment,
    wherein the message comprises the failed bearers mapping back to the apparatus.

18. The apparatus according to claim 10, wherein the at least one memory and the computer program code are further configured, with the at least one processor, to cause the apparatus at least to, when resources for the failed bearers mapped back to the apparatus cannot be allocated, regenerate a complete message releasing the failed bearers that cannot be mapped.

19. The apparatus according to claim 10, wherein the apparatus comprises a master evolved node B (MeNB).

20. A computer program, embodied on a non-transitory computer readable medium, the computer program configured to control a processor to perform a process, comprising:
    during a secondary evolved node B (SeNB) addition procedure, providing a target SeNB with an indication of SeNB change together with information on bearers that were served by a source SeNB;
    receiving bearer mapping for failed bearers from the target SeNB; and
    providing the source SeNB with the bearer mapping for the failed bearers.

21. A method, comprising:
    receiving, during a secondary evolved node B (SeNB) addition procedure, an indication of SeNB change together with information on bearers that were served by a source SeNB; and
    sending bearer mapping for failed bearers to a master evolved node B (MeNB) and configuration information of successfully accepted bearers by a target SeNB.

22. The method according to claim 21, further comprising:
    receiving a flag indicating whether the MeNB has sufficient resources to accommodate the failed bearers; and
    releasing the failed bearers when the flag indicates that the MeNB does not have sufficient resources for the failed bearers.

23. An apparatus, comprising:
    at least one processor; and
    at least one memory including computer program code,
    wherein the at least one memory and the computer program code are configured, with the at least one processor, to cause the apparatus at least to
    receive, during a secondary evolved node B (SeNB) addition procedure, an indication of SeNB change together with information on bearers that were served by a source SeNB; and
    send bearer mapping for failed bearers to a master evolved node B (MeNB) and configuration information of successfully accepted bearers by the apparatus.

24. The apparatus according to claim 23, wherein the at least one memory and the computer program code are further configured, with the at least one processor, to cause the apparatus at least to:
    receive a flag indicating whether the MeNB has sufficient resources to accommodate the failed bearers; and
    release the failed bearers when the flag indicates that the MeNB does not have sufficient resources for the failed bearers.

25. The apparatus according to claim 23, wherein the apparatus comprises a target SeNB.

26. A computer program, embodied on a non-transitory computer readable medium, the computer program configured to control a processor to perform a process, comprising:
    receiving, during a secondary evolved node B (SeNB) addition procedure, an indication of SeNB change together with information on bearers that were served by a source SeNB; and
    sending bearer mapping for failed bearers to a master evolved node B (MeNB) and configuration information of successfully accepted bearers by a target SeNB.

* * * * *